(12) United States Patent
Levy (10) Patent No.: US 6,889,322 B1
(45) Date of Patent: May 3, 2005

(54) IDENTIFICATION PROTOCOLS

(75) Inventor: Jordan Yaakov Levy, Jerusalem (IL)

(73) Assignee: NDS Ltd., West Drayton (GB)

( * ) Notice: Subject to any disclaimer, the term of this patent is extended or adjusted under 35 U.S.C. 154(b) by 0 days.

(21) Appl. No.: 09/480,231

(22) Filed: Jan. 10, 2000

(30) Foreign Application Priority Data

Feb. 18, 1999 (IL) ................................................ 128609

(51) Int. Cl.$^7$ ................................................ H04L 9/00
(52) U.S. Cl. ........................ 713/168; 713/169; 713/170; 380/28; 380/29; 380/30
(58) Field of Search ................................ 713/168, 169, 713/170; 380/28–30

(56) References Cited

U.S. PATENT DOCUMENTS

| | | | |
|---|---|---|---|
| 4,748,668 A | 5/1988 | Shamir et al. ................. | 380/30 |
| 5,130,519 A | 7/1992 | Bush et al. .................. | 235/380 |
| 5,473,689 A | 12/1995 | Eberhard ..................... | 380/23 |
| 5,987,134 A * | 11/1999 | Shin et al. ................... | 713/159 |
| 6,073,234 A * | 6/2000 | Kigo et al. .................. | 713/161 |
| RE37,178 E * | 5/2001 | Kingdon ..................... | 713/170 |
| 6,353,888 B1 * | 3/2002 | Kakehi et al. ............... | 713/168 |
| 6,377,691 B1 * | 4/2002 | Swift et al. .................. | 380/277 |
| 6,434,238 B1 * | 8/2002 | Chaum et al. ................. | 380/45 |
| 6,516,413 B1 * | 2/2003 | Aratani et al. .............. | 713/170 |
| 2001/0005899 A1 * | 6/2001 | Tanaka ......................... | 717/11 |

FOREIGN PATENT DOCUMENTS

| | | | |
|---|---|---|---|
| EP | 0 723 251 A2 | 7/1996 | ............ G07C/9/00 |
| EP | 0 782 115 A2 | 7/1997 | ............. G07F/7/10 |
| EP | 0 792 044 A2 | 8/1997 | ............. H04L/9/32 |

OTHER PUBLICATIONS

Bruce Schneier, *Applied Cryptography, Second Addition*, 1996, pp. 30, 86–88, 429, 442–445, and 503–512.

Alfred J. Menezes, Paul C. van Oorschot and Scott A. Vanstone, *Handbook of Applied Cryptography*, CRC Press, 1997, pp. 397–400 and 403–412.

Douglas R. Stinson, *Cryptography Theory and Practice*, CRC Press, 1995, pp. 283–285, 387–391, and 398–409.

Ross Anderson and Markus Kuhn, "Tamper Resistance—a Cautionary Note", USENIX Association, 1996.

* cited by examiner

Primary Examiner—Guy J. Lamarre
Assistant Examiner—Shin-Hon Chen
(74) Attorney, Agent, or Firm—Ladas & Parry LLP (57) ABSTRACT

In a method for verifying, by a verifier, that a prover has access to a private key associated with a public key Kp, in which the method comprises the prover generating a random number R and communicating a disguised form of the random number R to the verifier, an improvement including the prover generating the random number R based on an input received from the verifier.

Related apparatus and methods are also provided.

16 Claims, 4 Drawing Sheets

ID ENTIFICATION PROTOCOLS

FIELD OF THE INVENTION

The present invention relates to identification protocols in general, and in particular to identification protocols in which a prover proves its identity to a verifier.

BACKGROUND OF THE INVENTION

Identification protocols, in particular identification protocols in which a prover proves its identify to a verifier, are well known in the art. Identification protocols and related methods relevant to the present invention are described in the following references:
1. Bruce Schneier, *Applied Cryptography, Second Edition*, John Wiley & Sons, Inc., 1996.
2. Douglas R Stinson, *Cryptography Theory and Practice*, CRC Press, 1995.
3. Alfred J. Menezes, Paul C. van Oorschot, and Scott A. Vanstone, *Handbook of Applied Cryptography*, CRC Press, 1997.

One particular example of such an identification protocol is the Fiat-Shamir identification protocol, described in U.S. Pat. No. 4,748,668 to Shamir et al, and the related Feige-Fiat-Shamir protocol, described in *Applied Cryptography*, referred to above, at pages 503–508. Many other such identification protocols are known, with typical examples being described in *Applied Cryptography*, referred to above, at pages 503–512.

Many identification protocols are based on public key/private key systems, in which a user's public key is published and is known to everyone, while the private key is known only to the user. As is well known in the art, for such a system to work properly it must be extremely difficult to derive the private key from the public key. Typically, prior art protocols of the type discussed herein have the property that knowledge of the private key is preserved, so that the private key itself is revealed neither to an eavesdropper nor to a verifier.

Figure 1A:
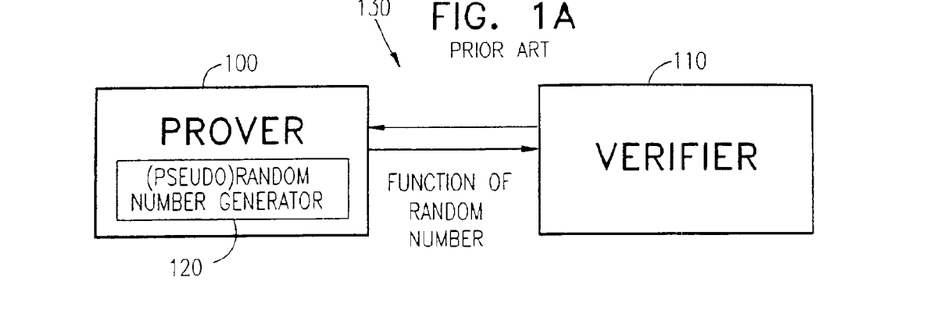
FIG. 1A is a simplified block diagram illustration of a prior art identification system.

FIG. 1 illustrates a typical prior art identification system. In such a system a prover 100 proves to a verifier 110 the identity of the prover 100, typically by proving knowledge of a private key known to the prover 100. Typically, as is well-known in the art, the method of proof includes generation of one or more random numbers by a random number generator or pseudo random number generator 120, as is well known in the art, comprised in the prover 100. Random numbers so produced are used as part of a protocol 130 for communication between the prover 100 and the verifier 110. Typically, it is important for the security of the protocol that the random number generator produce unpredictable random numbers or pseudo random numbers that can not be predicted or controlled by the verifier 110.

Figure 1B:
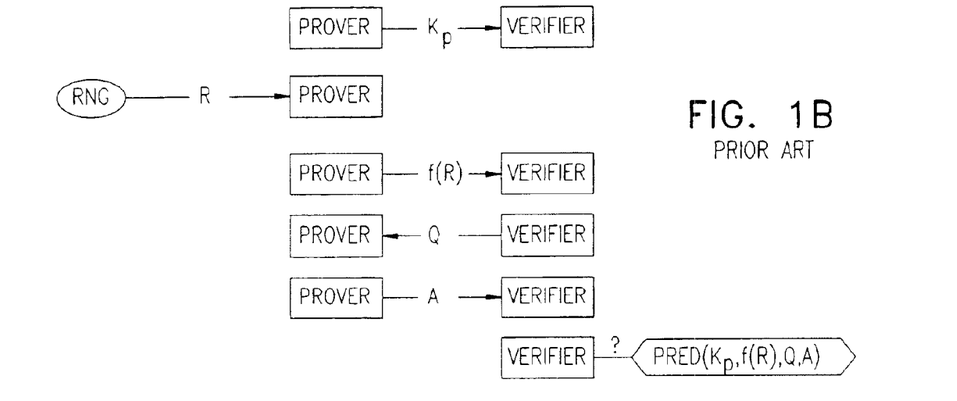
FIGS. 1B and 1C are simplified illustrations of prior art identification protocols useful in conjunction with the system of FIG. 1A.
Figure 1C:
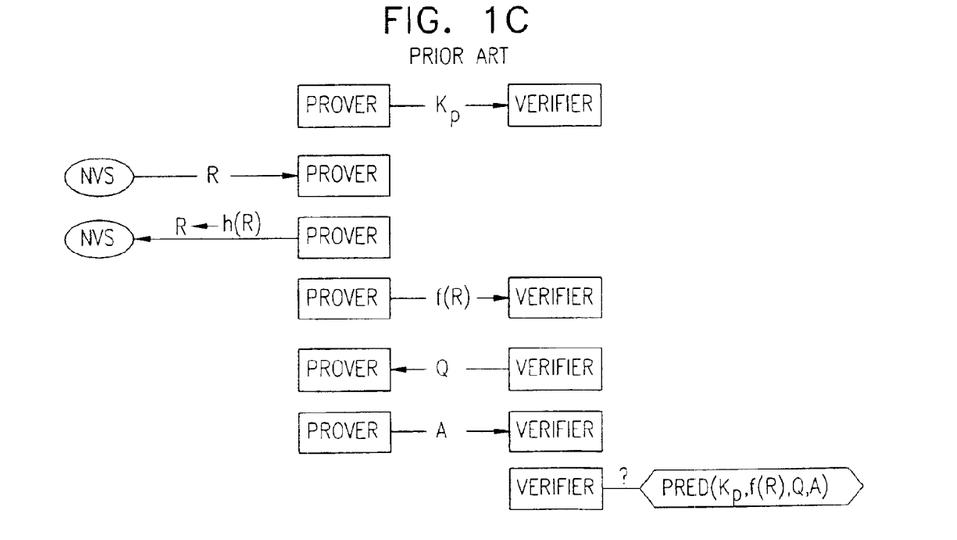

Typical prior art identification protocols usable with the prior art system of FIG. 1 are illustrated in FIGS. 1B and 1C. In FIG. 1B, a true random number generator RNG is used, while in FIG. 1C pseudo-random numbers are generated using values stored in non-volatile storage NVS and acted upon by a cryptographically secure function, also termed herein a one-way hash function, h.

The term "cryptographically secure function" as used herein, is taken, for the purposes of the present specification and claims, to be equivalent to the following terms, which are well-known in the art and which are defined in *Applied Cryptography*, referred to above, on the indicated pages:
  "collision-free hash function", p. 30; and
  "collision-resistant hash function", p. 429.
The term "one-way hash function", as used throughout the present specification and claims, is used to refer to a cryptographically secure function, unless otherwise specified.

In a typical prior art protocol, such as those illustrated in FIGS. 1B and 1C, the prover sends an identification string to the verifier, the identification string typically comprising a public key Kp of the prover, either explicitly, typically in the form of a signed key certificate, or implicitly, such that the public key Kp is mathematically derivable from the identification string.

The prover then chooses a random number R and sends f(R) to the verifier, where f is a function that is difficult to reverse, at least difficult to reverse without knowledge of some secret. For example, in Feige-Fiat-Shamir identification, f is the operation of modulo-squaring, with the modulus comprising a composite number having no small prime factors.

The verifier responds with a challenge Q. The prover responds to the challenge Q with an answer A which satisfies some predicate relationship Pred(A,Q,f(R),Kp). The verifier verifies that the predicate relationship is indeed satisfied, thus producing evidence of the identity of the prover.

Typically, the steps mentioned above comprise a single identification round, and multiple identification rounds are typically performed in order to establish the identity of the prover with a high degree of confidence.

More detailed examples of identification protocols are found in U.S. Pat. No. 4,748,668 to Sharir et al and in *Applied Cryptography*, pages 503–512, both referred to above.

Methods of tampering with protocols such as those described above are described in the following reference:
Ross Anderson and Marcus Kuhn, "Tamper Resistance—A Cautionary Note", USENIX Association, The Second USENIX Workshop on Electronic Commerce, *Proceedings*, Oakland, Calif., Nov. 18–21, 1996, pp. 1–11. In particular, in regard to random number generators, Anderson and Kuhn state that "[l]ow voltage can facilitate other attacks too: at least one card has an on-board analogue random number generator, used to manufacture cryptographic keys and nonces, which will produce an output of almost all 1's when the supply voltage is lowered slightly."

The disclosures of all references mentioned above and throughout the present specification are hereby incorporated herein by reference.

SUMMARY OF THE INVENTION

The present invention seeks to provide an improved identification system and protocol, including improvements which may be applied to existing identification systems and protocols.

The prior art identification systems and protocols described above have a number of drawbacks. Many public key identification protocols require the prover to generate an independent random number seed for each application or iteration of the protocol. The prover is thus required to have one of the following:
  1. Access to a true random number generator.
  2. Dynamically updatable non-volatile memory such as, for example, EEPROM or disk, in which a current pseudo-random number, generated via a cryptographically-secure function from a previous pseudo-random number, is stored; it is appreciated that, equivalently, the next pseudo-random number may be stored.

In many actual applications, the prover is a small, inexpensive object such as a smart card, while the verifier is a larger, more expensive, and potentially more physically secure computer. These qualities tend to make the drawbacks of the prior art more serious in practice than in theory.

Additional hardware, as specified above to implement random or pseudo random number generation, is required in the prover, thus increasing the complexity and price of the prover. Furthermore, there are potentially severe security penalties in generating a random or pseudo random number in the prover; for example:

1. True random number generators generally comprise analog circuitry, and may therefore be especially susceptible to external attacks, such as environmental attacks, designed to degrade the entropy of the random number generator. Also, random number generators including analog circuitry are less likely to be tightly integrated with a digital processing core comprised in the prover, thus making eavesdropping on the internal communication line more feasible. Such eavesdropping could be used to expose the random number and hence, as is well known in the art, to expose the secret or secrets hidden in the protocol, such as the private key of the prover.

2. There is an enhanced opportunity for active external attack to interfere with the internal functioning of the prover via an attack on the random number generator. For example, external means might be used to prevent writing to EEPROM, thus causing the same "random" number to be used twice.

3. There is a greater risk of exposure of the random number in a case where it is stored, since typical identification protocols require that the random number never be reused and that the random number be kept secret.

In the present invention, the prover is relieved of the necessity of random number generation as previously known in the art, in that the verifier can propose a seed for generating the random numbers. The present invention is applicable in general to identification methods where a verifier verifies that a prover has access to a private key associated with a public key Kp, in which the method includes the prover generating a random number R and communicating a disguised form of the random number R to the verifier.

It is a goal of the present invention to allow the verifier to propose a seed while maintaining the following principles of security:

1. A prover can not easily take advantage of the modified protocol to improve his chances of successfully proving a false identity.

2. A verifier can not choose the seed for the random number in such a way as to "trick" the prover into revealing the secret of which the prover is to prove knowledge.

One example, not meant to be limiting, of a real-world scenario in which the present invention would be applicable would be that of a smart card as prover and an automatic teller machine kiosk as verifier. This example illustrates the cost and security advantages:

Cost—a large number of provers exists for one verifier, and there is a very large ratio between cost, size, and potential computing power between the two in favor of the verifier; hence it is advantageous to shift part of the protocol from the prover to the verifier.

Security—the provers are most of the time in the hands of the users, and thus a potential attacker has ample opportunity to attempt to analyze and attack the provers in order to extract secrets that may be used, for example, to clone an identity.

Protocols for which the present invention is applicable typically have the following properties:

1. The prover chooses a random value and sends some function of the random value, also known as the commit value, to the verifier. After this step, the verifier supplies a challenge value and requires the prover to supply some answer value typically related to the public identify of the prover, the commit value, and the challenge.

2. The verifier must be able to verify that the answer value satisfies the required relationship without any knowledge of the secret whose knowledge is being proved; preferably, the secret is not deducible either by the verifier or by an eavesdropper.

3. A would-be prover, when supplying any commit value, is not able to answer the challenge for some percent of the possible challenges, unless the prover really knows the secret, which may comprise a plurality of secrets. For example and without limiting the foregoing, in a single round of Feige-Fiat-Shamir authentication with k secrets, a would-be prover who does not know any of the secrets will be able to answer the challenge correctly for only 1 out of $2^k$ challenges. Conversely, if the prover were able to predict the challenge the prover would be able to supply a commit value for which the prover would appear to prove knowledge of the secret, without actually knowing the secret.

4. Exposure or re-use of the random number that is related to the commit value as described above reveals information about the secrets, typically if the same commit value is later challenged with a different challenge. In certain protocols, use of two closely related random values may also reveal information; for example, in Feige-Fiat-Shamir identification information may be revealed if both $R^2$ and $(2R)^2$ are used as commit values.

In the present invention, the verifier proposes a seed which the prover maps, typically via a secret function, to the random number required for the protocol. Thus the prover is relieved of the burden of choosing a random number, but the random number is still known only to the prover.

The seed is in turn derived from the challenge query via a cryptographic function. Since in many protocols the query search space is limited, the function will also receive as input padding randomly chosen by the verifier. When, later in the protocol, the verifier offers the challenge it also offers the padding. An appropriate collision-free one-way hash function assures that the verifier can not offer multiple challenges to a single commit value, while at the same time assuring that the prover can not determine, at the time of committing, the challenge that will be offered.

It will be appreciated by persons skilled in the art that the present invention typically makes use of a technique known as "bit commitment". Bit commitment in general is described in *Applied Cryptography*, referred to above, at pages 86–88.

There is thus provided in accordance with a preferred embodiment of the present invention a method for verifying, by a verifier, that a prover has access to a private key associated with a public key Kp, the method including the prover sending an identification message to the verifier, the identification message including an indication of an identity of the prover, the indication of the identity including an indication of Kp, performing an identification round, the identification round including the verifier choosing a challenge Q and a padding string X, the verifier sending an initialization message to the prover, the initialization message including a disguised form Y produced by applying a public disguising function Fp to Q and X, Y being equal to Fp(Q,X), the prover computing a random number R by applying a private disguising function Fv to Y, R being equal to Fv(Y), the prover sending a commit message to the verifier, the commit message including a disguised form of R produced by applying a function f to R, the disguised form of R being equal to f(R), the verifier sending a challenge message to the prover, the challenge message including the challenge Q and the padding string X, the prover verifying that $Y=Fp(Q,X)$, the prover sending a response message to the verifier, the response message including a response A, the response A satisfying a predicate relationship $Pred(A, Q,f(R),Kp)$, wherein satisfying the predicate relationship provides an indication that the prover has access to the private key, and the verifier verifying that A satisfies the predicate relationship $Pred(A,Q,f(R),Kp)$, and the verifier determining that the prover has access to the private key based on a result of the performing step.

Further in accordance with a preferred embodiment of the present invention the method also includes subsequent to the prover verifying that $Y=Fp(Q,X)$, using the value $Fp(Q,X)$ instead of the value Y of the verifier sending step in all subsequent operations using Y.

Still further in accordance with a preferred embodiment of the present invention the performing step is performed iteratively a plurality of times, and the verifier determining step includes determining based on a plurality of results each associated with one of the plurality of times that the performing step is performed.

Additionally in accordance with a preferred embodiment of the present invention'the disguising function Fp includes a one-way hash function.

Moreover in accordance with a preferred embodiment of the present invention the private disguising function Fv includes a one-way hash function.

Further in accordance with a preferred embodiment of the present invention the public disguising function Fp includes a public key dependent disguising function Fpp dependent, in part, on the public key Kp, and Y is equal to $Fpp(Q,X,Kp)$, and the prover verifying step includes the prover verifying that $Y=Fpp(Q,X,Kp)$.

Still further in accordance with a preferred embodiment of the present invention the function f includes $R^2$ modulo N.

There is also provided in accordance with another preferred embodiment of the present invention, in a method for verifying, by a verifier, that a prover has access to a private key associated with a public key Kp, in which the method includes the prover generating a random number R and communicating a disguised form of the random number R to the verifier, an improvement including the prover generating the random number R based on an input received from the verifier.

Further in accordance with a preferred embodiment of the present invention the input received from the verifier includes a commitment to a future query, and the method also includes the prover verifying, upon receipt of the future query, that the future query matches the commitment.

There is also provided in accordance with another preferred embodiment of the present invention a system for verifying access to a private key associate with a public key Kp, the system including a verifier, and a prover including a disguising unit, wherein the prover is operative to send an identification message to the verifier, the identification message including an indication of an identity of the prover, the indication of the identity including an indication of Kp, and the prover and the verifier together are operative to perform an identification round, the identification round including the verifier choosing a challenge Q and a padding string X, the verifier sending an initialization message to the prover, the initialization message including a disguised form Y produced by applying a public disguising function Fp to Q and X, Y being equal to $Fp(Q,X)$, the prover computing a random number R by applying a private disguising function Fv to Y, R being equal to $Fv(Y)$, the prover sending a commit message to the verifier, the commit message including a disguised form of R produced by applying a function f to R, the disguised form of R being equal to f(R), the verifier sending a challenge message to the prover, the challenge message including the challenge Q and the padding string X, the prover verifying that $Y=Fp(Q,X)$, the prover sending a response message to the verifier, the response message including a response A, the response A satisfying a predicate relationship $Pred(A,Q,f(R),Kp)$, wherein satisfying the predicate relationship provides an indication that the prover has access to the private key, and the verifier verifying that A satisfies the predicate relationship $Pred(A,Q,f(R),Kp)$, and the verifier is operative to determine that the prover has access to the private key based on a result of the identification round.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 2:
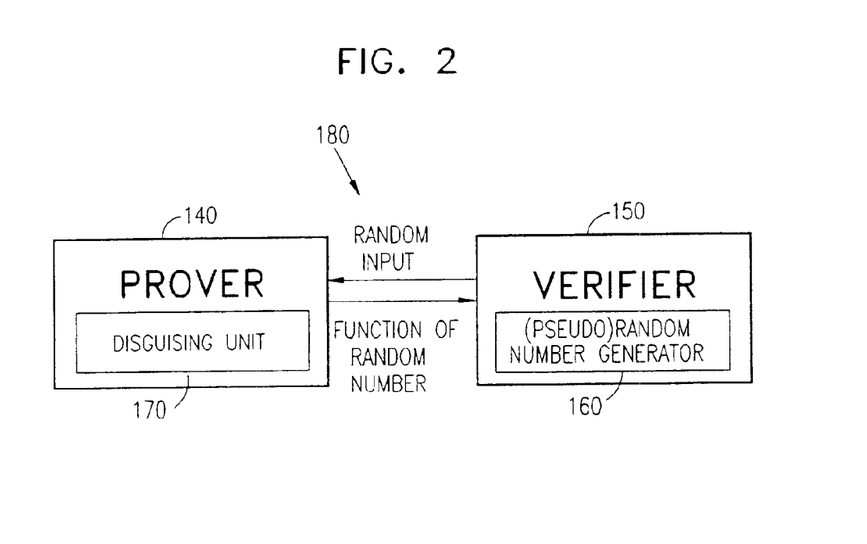
FIG. 2 is a simplified block diagram illustration of an identification system constructed and operative in accordance with a preferred embodiment of the present invention.

Reference is now made to FIG. 2 which is a simplified block diagram illustration of an identification system constructed and operative in accordance with a preferred embodiment of the present invention. The system of FIG. 2 comprises a prover 140 and a verifier 150, each preferably implemented in a combination of hardware, preferably tamper resistant hardware, and software as is well-known in the art. Except as described below, the structure and function of the prover 140 and the verifier 150 may be similar to those of provers and verifiers that are well-known in the art for implementation of identification protocols.

The verifier 150 preferably comprises a random or pseudo random number generator 160, which may be operative to produce random or pseudo random numbers in accordance with any appropriate method known in the art.

The prover 140 preferably comprises a disguising unit 170, the disguising unit 170 typically being operative to apply a disguising function such as a one-way hash function, particularly a private one-way hash functions, to a supplied input to obtain a disguised or hashed output. As is well known in the art, a private one-way hash function may comprise a private function, that is, a function which is kept secret. Alternatively, a private one-way hash function may comprise a public function and a private key, that is, the function may be publicly known but the key is kept private.

The prover 140 and the verifier 150 are preferably operative to engage in an identification protocol 180, the identification protocol including the transmission of a random input, derived from an output of the random number generator 160, from the verifier 150 to the prover 140. The prover 140 is preferably operative to use the random input to produce, preferably by using the disguising unit 170, a random number, a function of which is transmitted from the prover 140 to the verifier 150.

Figure 3:
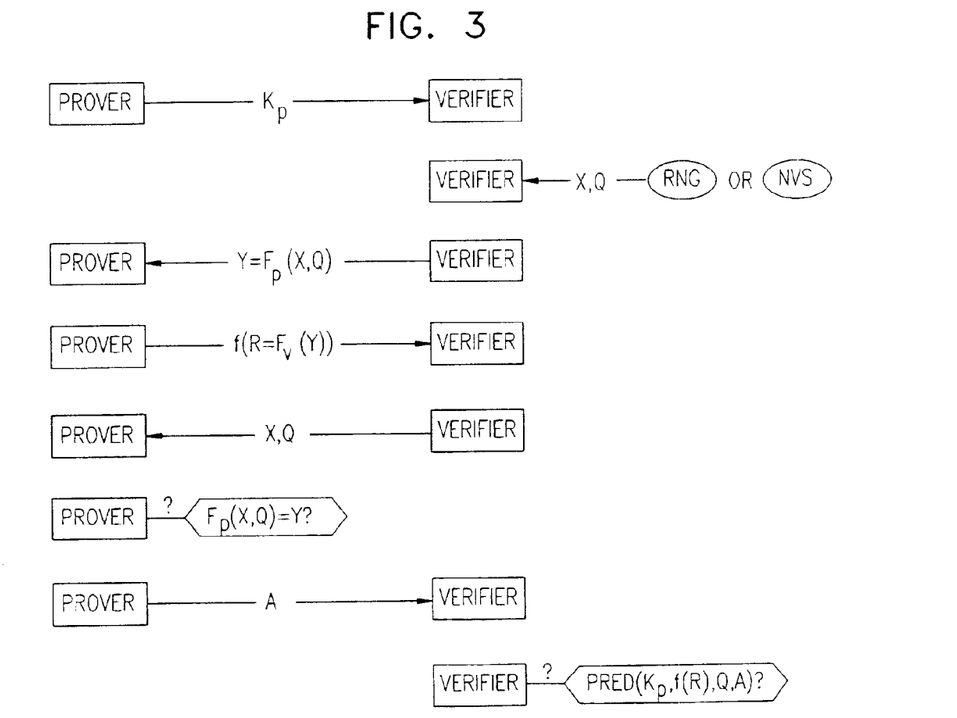
FIG. 3 is a simplified illustration of an identification protocol useful in conjunction with the system of FIG. 2.

The operation of the system of FIG. 2 is now briefly described. Reference is now additionally made to: FIG. 3, which is a simplified illustration of an identification protocol useful in conjunction with the system of FIG. 2; and FIGS. 4A and 4B which, taken together, comprise a simplified flowchart illustration of a preferred method of operation of the system of FIG. 2, the method of FIGS. 4A and 4B corresponding to the identification protocol of FIG. 3. The protocol of FIG. 3 is self-explanatory, particularly with regard to the discussion below of FIGS. 4A and 4B.

Figure 4A:
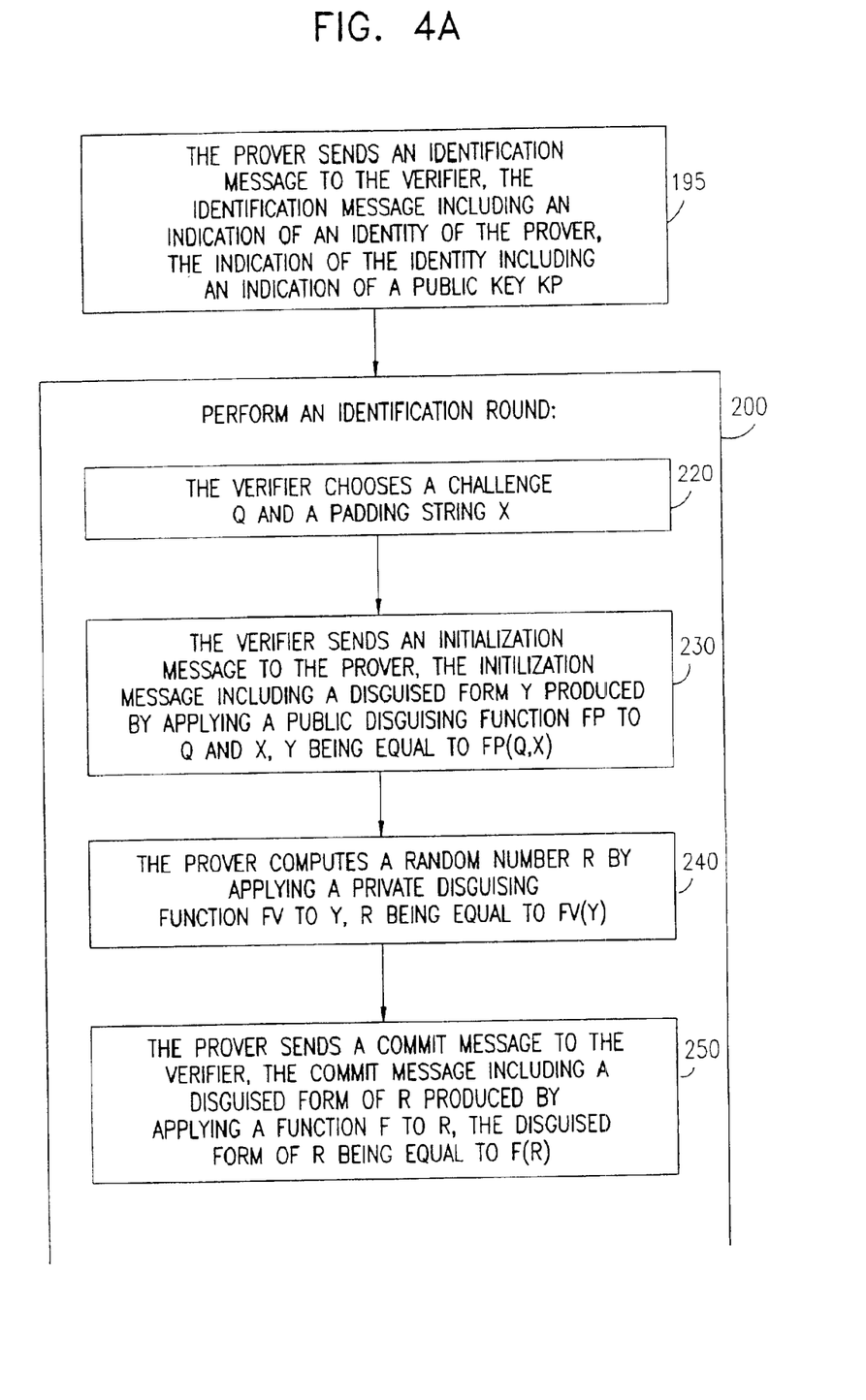
FIGS. 4A and 4B, taken together, comprise a simplified flowchart illustration of a preferred method of operation of the system of FIG. 2, the method of FIGS. 4A and 4B corresponding to the identification protocol of FIG. 3.
Figure 4B:
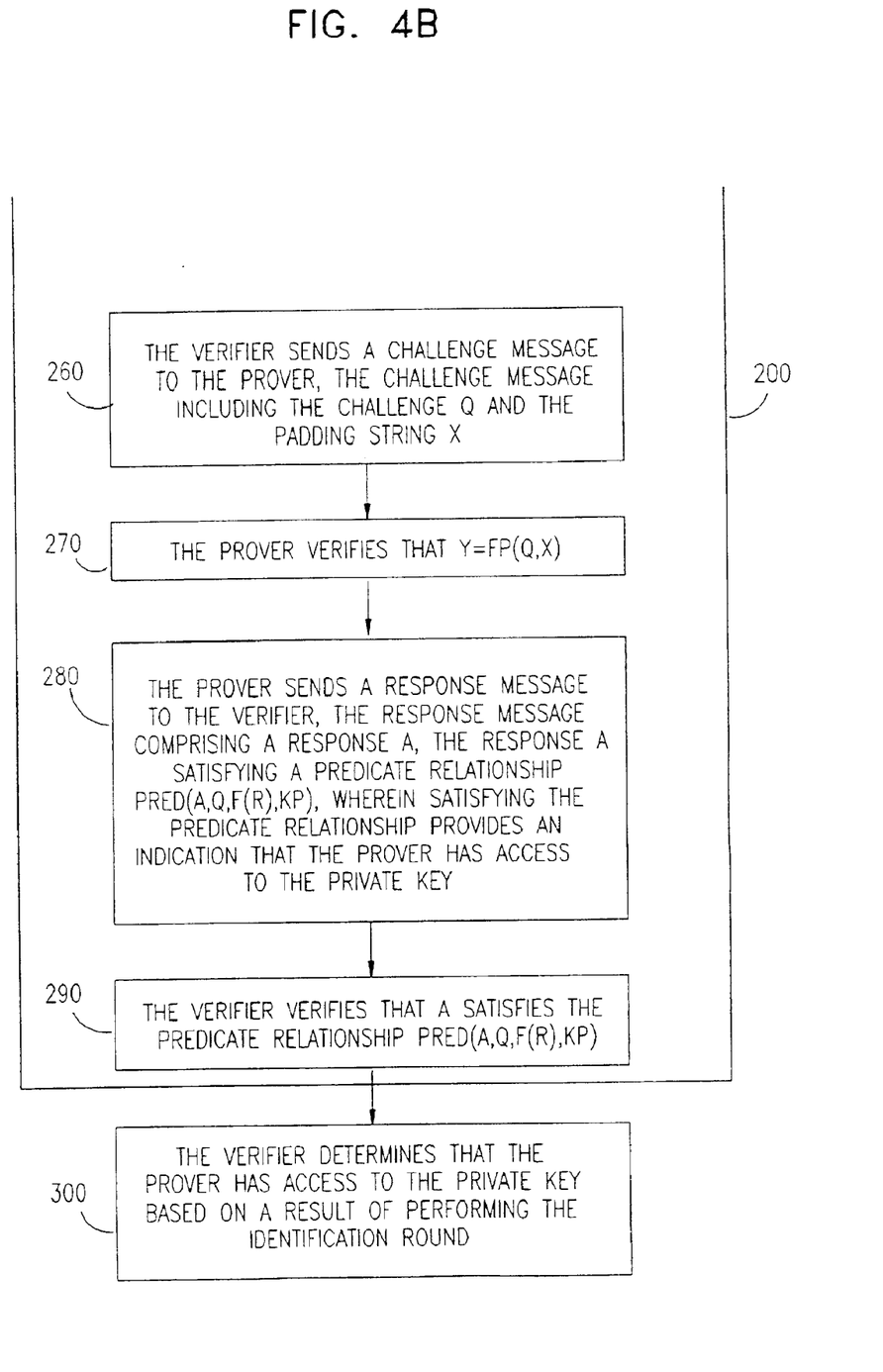

The method of FIGS. 4A and 4B preferably comprises the following steps:

The prover sends an identification message to the verifier, the identification message typically including an indication of an identity of the prover, the indication of the identity typically including an indication of a public key Kp (step 195). The indication of the public key Kp may, for example, comprise an explicit indication of the public key Kp, such as a signed certificate indicating the validity of the public key Kp. Alternatively, the indication of the public key Kp may, for example, comprise an implicit indication of the public key Kp, such as a number from which the public key Kp is mathematically derivable. The goal of the method of FIGS. 4A and 4B is for the prover to provide proof to the verifier that the prover knows a private key which has a predefined relationship to the public key Kp, without actually revealing the private key.

An identification round is performed (step 200); the identification round typically comprises all of the subsequent steps of FIGS. 4A and 4B, described below, except for step 300. As is well known in the art in identification protocols, the entire identification round of step 200 may be performed a plurality of times, as is typical in the case of certain protocols such as the Feige-Fiat-Shamir protocol; alternatively, the entire identification round of step 200 may be performed once, as is typical in the case of certain protocols such as the Guillou-Quisquater protocol, described in *Applied Cryptography*, referred to above, at pages 508–510.

The verifier chooses a challenge Q and a padding string X (step 220); the padding string X is preferred for greater security in cases where the challenge Q is short, but the padding string X may be omitted, especially in cases where the challenge Q is long. Preferably, the padding string X, if present, is chosen so that the length of Q+X is at least equal to 80 bits, and more preferably to at least 128 bits or 160 bits.

The verifier then sends an initialization message to the prover, the initialization message including a disguised form Y produced by applying a public disguising function Fp to Q and X, Y being equal to Fp(Q,X) (step 230). The public disguising function is preferably public in the sense that the function is known, particularly to the prover; typically, the public disguising function Fp comprises a one-way hash function, but another appropriate type of function may be used. By way of example only and without limiting the generality of the foregoing, one possible choice for the public disguising function Fp would be the SHA function, described in *Applied Cryptography*, referred to above, at pages 442–445. For greater security and to prevent playback of a protocol round previously used with another prover, the disguising function Fp(Q,X) preferably comprises a key dependent disguising function Fpp(Q,X,Kp), so that the behavior of the disguising function Fp is dependent on the public key Kp.

The prover computes a random number R by applying a private disguising function Fv to Y, R being equal to Fv(Y) (step 240); the private disguising function Fv may be any appropriate disguising function, such as a one-way hash function, but another appropriate type of function may be used. As mentioned above, a private one-way hash function or a public one-way hash function with a private key may be used.

The prover sends a commit message to the verifier, the commit message including a disguised form of R produced by applying a function f to R, the disguised form of R being equal to f(R) (step 250). As explained above, the particular function f is chosen according to a particular protocol; in the case of the Feige-Fiat-Shamir protocol, which is well known in the art and described above, f may comprise $R^2$ modulo N, N typically being a composite number which is a product of two large prime numbers.

The verifier sends a challenge message to the prover, the challenge message including the challenge Q and the padding string X (step 260). The prover verifies that Y=Fp(Q,X) (step 270); this is possible since the public disguising function Fp is known to the prover. Preferably, to avoid attacks on the prover which might involve confusing the prover as to which action to take based on the outcome of this check, the newly computed value Fp(Q,X) is preferably used in further computations in place of the previously received value Y; such an attack might confuse the prover into continuing as if Fp(Q,X) is equal to the received value of Y even when this is not the case. Using the newly computed value Fp(Q,X) is intended to cause the protocol to fail to operate properly in case of such an attack.

The prover sends a response message to the verifier, the response message comprising a response A, the response A satisfying a predicate relationship Pred(A,Q,f(R),Kp), wherein satisfying the predicate relationship provides an indication that the prover has access to the private key (step 280). Precisely which predicate relationship is chosen depends, as is well known in the art, on the particular type of identification protocol being used. In the case of Feige-Fiat-Shamir, the predicate relationship is well-known and may be determined by reference to U.S. Pat. No. 4,748,668 to Shamir et al and *Applied Cryptography*, pages 503–512, referred to above. Typically, the indication is an indication with a quantifiable probability; for example, in the case of k-secret Feige-Fiat-Shamir, the probability is $(1-2^{-k})$, as is well-known in the art.

The verifier verifies that A satisfies the predicate relationship Pred(A,Q,f(R),Kp) (step 290).

The verifier then determines that the prover has access to the private key based on a result of performing the identification round of step 200 (step 300). If a single identification round is performed, the determination of step 300 is typically based on the result of step 290. If multiple identification rounds are performed, the determination of step 300 is typically based on a combination of the results of step 290 from each identification round.

It is appreciated that no known identification protocol is perfect, and it is therefore appreciated that there may be certain drawbacks in the present invention. For instance, it is appreciated that if a prover were able to follow the internal workings of the verifier from the outside, the prover would be able to know the value of the challenge Q at step 220 or 230; this would allow cheating at step 240, and might therefore allow the prover to prove a false identity.

It is also appreciated that the present invention may be economical to implement because each prover need not comprise a random or pseudo random number generator, but in the present invention the verifier is required to comprise such a random number generator. It is believed that the feature of the random number generator being comprised in the verifier is generally advantageous, for reasons mentioned above relating to the relative size, cost, and number of provers and verifiers.

It is appreciated that, if a dishonest verifier could find two pairs (Q1,X1) and (Q2,X2) such that Q1 is not equal to Q2 but Fp(Q1,X1)=Fp(Q2,X2), the verifier could force the prover to use the same commit value while being challenged with distinct queries; in most instances, this will cause the leak of information about the secret whose knowledge is being proved. Therefore, preferably the function Fp should meet the following criteria:

1. Fp should be structurally collision-free; that is, it is difficult to find distinct inputs that map to a common output. The indicated property is beyond the usual requirement for hash functions in some cryptographic protocols, in which it is sufficient for it to be difficult to find a second input which maps to the same output for a given, fixed first input. General background on hash functions and cryptographic protocols is found in *Applied Cryptography*, referred to above.

2. Be wide enough in input and output to resist birthday attacks, which are a well-known brute force type of method of finding collisions without structural analysis of the hash function. General background on birthday attacks and methods of avoiding them is found in *Applied Cryptography*, referred to above.

3. As mentioned above with reference to the Fpp function, public identification information or the public key Kp of the prover should be included as a third input. Any collision that is found then allows a dishonest verifier to extract secrets only from the single identity associated with Kp, rather than from any identity. Thus, potential damage in the event that a collision is found is greatly limited.

It is further appreciated that the present invention, by introducing a degree of cooperation between the prover and the verifier in obtaining the random number R, is believed to prevent the proof of identity carried out by the protocol from being zero-knowledge, as that term is understood in the art. The lack of the zero-knowledge property is not believed to introduce undesirable features, and is not believed to detract from the security of the present invention in terms of increasing the chance of a dishonest prover to fake an identity, or of a dishonest verifier to abuse the protocol to extract secrets, beyond what has been described above.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined only by the claims which follow:

What is claimed is:

1. A method for verifying, by a verifier, that a prover has access to a private key associated with a public key Kp, the method comprising:

the prover sending an identification message to the verifier, the identification message comprising an indication of an identity of the prover, the indication of the identity including an indication of Kp;

performing an identification round, the identification round comprising:

the verifier choosing a challenge Q and a padding string X;

the verifier sending an initialization message to the prover, the initialization message comprising a disguised form Y produced by applying a public disguising function Fp to Q and X, Y being equal to Fp(Q,X);

the prover computing a random number R by applying a private disguising function Fv to Y, R being equal to Fv(Y);

the prover sending a commit message to the verifier, the commit message comprising a disguised form of R produced by applying a function f to R, the disguised form of R being equal to f(R);

the verifier sending a challenge message to the prover, the challenge message comprising the challenge Q and the padding string X;

the prover verifying that Y=Fp(Q,X);

the prover sending a response message to the verifier, the response message comprising a response A, the response A satisfying a predicate relationship Pred (A,Q,f(R),Kp), wherein satisfying the predicate relationship provides an indication that the prover has access to the private key; and the verifier verifying that A satisfies the predicate relationship Pred(A,Q,f(R),Kp); and the verifier determining that the prover has access to the private key based on a result of the performing step.

2. A method according to claim 1 and also comprising:

subsequent to the prover verifying that Y=Fp(Q,X), using the value Fp(Q,X) instead of the value Y of the verifier sending step in all subsequent operations using Y.

3. A method according to claim 1 and wherein the performing step is performed iteratively a plurality of times, and the verifier determining step includes determining based on a plurality of results each associated with one of the plurality of times that the performing step is performed.

4. A method according to claim 3 and wherein the disguising function Fp comprises a one-way hash function.

5. A method according to claim 3 and wherein the private disguising function Fv comprises a one-way hash function.

6. A method according to claim 3 and wherein the public disguising function Fp comprises a public key dependent disguising function Fpp dependent, in part, on the public key Kp, and Y is equal to Fpp(Q,X,Kp), and the prover verifying step comprises the prover verifying that Y=Fpp(Q,X,Kp).

7. A method according to claim 3 and wherein the function f comprises $R^2$ modulo N.

8. A method according to claim 1 and wherein the disguising function Fp comprises a one-way hash function.

9. A method according to claim 1 and wherein the private disguising function Fv comprises a one-way hash function.

10. A method according to claim 1 and wherein the public disguising function Fp comprises a public key dependent disguising function Fpp dependent, in part, on the public key Kp, and Y is equal to Fpp(Q,X,Kp), and the prover verifying step comprises the prover verifying that Y=Fpp(Q,X,Kp).

11. A method according to claim 1 and wherein the function f comprises $R^2$ modulo N.

12. A method according to claim 1 and wherein the padding string X comprises randomly chosen padding.

13. A system for verifying access to a private key associated with a public key Kp, the system comprising:

a verifier; and a prover comprising a disguising unit;

wherein the prover is operative to send an identification message to the verifier, the identification message comprising an indication of an identity of the prover, the indication of the identity including an indication of Kp; and the prover and the verifier together are operative to perform an identification round, the identification round comprising:

the verifier choosing a challenge Q and a padding string X;

the verifier sending an initialization message to the prover, the initialization message comprising a disguised form Y produced by applying a public disguising function Fp to Q and X, Y being equal to Fp(Q,X);

the prover computing a random number R by applying a private disguising function Fv to Y in the disguising unit, R being equal to Fv(Y);

the prover sending a commit message to the verifier, the commit message comprising a disguised form of R produced by applying a function f to R, the disguised form of R being equal to f(R);

the verifier sending a challenge message to the prover, the challenge message comprising the challenge Q and the padding string X;

the prover verifying that Y=Fp(Q,X);

the prover sending a response message to the verifier, the response message comprising a response A, the response A satisfying a predicate relationship Pred (A,Q,f(R),Kp), wherein satisfying the predicate relationship provides an indication that the prover has access to the private key; and the verifier verifying that A satisfies the predicate relationship Pred(A,Q,f(R),Kp); and the verifier is operative to determine that the prover has access to the private key based on a result of the identification round.

14. A system according to claim 13 and wherein the padding string X comprises randomly chosen padding.

15. A prover for use with a verifier for verifying access to a private key associated with a public key Kp, the prover comprising:

a disguising unit;

wherein the prover is operative to send an identification message to the verifier, the identification message comprising an indication of an identity of the prover, the indication of the identity including an indication of Kp; and the prover and the verifier together are operative to perform an identification round, the identification round comprising:

the verifier choosing a challenge Q and a padding string X;

the verifier sending an initialization message to the prover, the initialization message comprising a disguised form Y produced by applying a public disguising function Fp to Q and X, Y being equal to Fp(Q,X);

the prover computing a random number R by applying a private disguising function Fv to Y in the disguising unit, R being equal to Fv(Y);

the prover sending a commit message to the verifier, the commit message comprising a disguised form of R produced by applying a function f to R, the disguised form of R being equal to f(R);

the verifier sending a challenge message to the prover, the challenge message comprising the challenge Q and the padding string X;

the prover verifying that Y=Fp(Q,X);

the prover sending a response message to the verifier, the response message comprising a response A, the response A satisfying a predicate relationship Pred (A,Q,f(R),Kp), wherein satisfying the predicate relationship provides an indication that the prover has access to the private key; and the verifier verifying that A satisfies the predicate relationship Pred(A,Q,f(R),Kp); and the verifier is operative to determine that the prover has access to the private key based on a result of the identification round.

16. A prover according to claim 15 and wherein the padding string X comprises randomly chosen padding.

* * * * *